(12) United States Patent  
Vetter

(10) Patent No.: US 6,370,008 B1  
(45) Date of Patent: Apr. 9, 2002

(54) CAPACITOR FILM FOR A SELF-HEALING FILM CAPACITOR

(75) Inventor: Harald Vetter, Heidenheim (DE)

(73) Assignee: EPCOS AG, München (DE)

( * ) Notice: Subject to any disclaimer, the term of this patent is extended or adjusted under 35 U.S.C. 154(b) by 0 days.

(21) Appl. No.: 09/622,319

(22) PCT Filed: Feb. 10, 1999

(86) PCT No.: PCT/DE99/00363

§ 371 Date: Oct. 5, 2000

§ 102(e) Date: Oct. 5, 2000

(87) PCT Pub. No.: WO99/43011

PCT Pub. Date: Aug. 26, 1999

(30) Foreign Application Priority Data

Feb. 17, 1998 (DE) .......................................... 198 06 586

(51) Int. Cl.⁷ .............................................. H01G 4/015
(52) U.S. Cl. ...................... 361/273; 361/290; 361/278; 361/280; 361/281
(58) Field of Search ................................ 361/273, 303, 361/304, 313, 290, 292, 306.1, 311, 257.3, 275.1, 278, 280, 281

(56) References Cited

U.S. PATENT DOCUMENTS

| | | | | |
|---|---|---|---|---|
| 1,963,987 A | * | 6/1934 | Seimens | |
| 3,740,623 A | * | 6/1973 | Toro | 317/258 |
| 4,305,111 A | * | 12/1981 | Forster | 361/273 |
| 4,477,858 A | * | 10/1984 | Steiner | 361/273 |
| 4,819,127 A | | 4/1989 | Gizolme et al. | |
| 5,615,078 A | * | 3/1997 | Hudis et al. | 361/313 |
| 5,757,607 A | * | 5/1998 | Folli | 361/273 |
| 6,040,038 A | * | 3/2000 | Momose | 428/209 |

FOREIGN PATENT DOCUMENTS

| | | |
|---|---|---|
| DE | 43 28 615 | 3/1995 |
| DE | 196 39 877 | 4/1998 |
| EP | 0 088 137 | 9/1983 |
| EP | 0 640 996 | 3/1995 |
| EP | 0 789 371 | 11/1996 |
| FR | 2 605 140 | 4/1988 |

* cited by examiner

Primary Examiner—Dean A. Reichard
Assistant Examiner—Nguyen Ha
(74) Attorney, Agent, or Firm—Schiff Hardin & Waite

(57) ABSTRACT

The invention relates to a metallization for a film capacitor, wherein a dielectric capacitor film provided with a metallic coating is wound into a capacitor element in the running direction of the capacitor film, whereby the coating is provided with a segmentation.

10 Claims, 1 Drawing Sheet

CAPACITOR FILM FOR A SELF-HEALING FILM CAPACITOR

BACKGROUND OF THE INVENTION

The present invention relates to a metallization for a self-healing film capacitor, wherein a dielectric capacitor film provided with a metallic coating is wound into a capacitor element in the running direction of the film, whereby the coating is provided with a segmentation.

The utilization possibilities of power capacitors are predominantly fixed by means of the respective allowable limiting values for the operating field intensity, the surge current load capability and the thermal resistance. Therefore, power capacitors can only be used in a framework, in which the limiting values for the operating field intensity, the surge current load capability or, respectively, the thermal resistance are not exceeded.

Given the self-healing power capacitors, the limiting value for the operating field intensity is essentially determined by the regeneration dependability of the relevant dielectric structure or, respectively, of the capacitor element. Among other things, the regeneration dependability is, in turn, dependent on the metallization, the thermal resistance and the thermal capability of the capacitor element, which is essentially formed of a dielectric film that is provided with a metallic coating.

Given a self-healing film capacitor, the largest part of the loss arises in the metallic coatings. For purposes of making these losses as small as possible, the coatings, per se, can be designed thicker, so that their surface resistances are reduced. However, such a course of action is extremely limited due to the regeneration dependability of the capacitor element: as known, at least one coating must be kept thin, so that this regeneration dependability is guaranteed.

However, the utilization of coatings that are designed transversely profiled or wedge-profiled instead of the utilization of homogenous coatings effected improvements concerning a reduction of the losses. It has shown that the regeneration behavior of so structured coatings is most disadvantageous in the center of the winding width of the capacitor element, so that the minimally allowed surface resistance is fixed in this region.

The utilization of coatings that are fashioned transverse to the film running direction with different alloy parts has already been taken into consideration for a.c. voltage capacitors. Such a course of action is particularly expedient for film capacitors with a comparatively large structural shape or, respectively, winding width.

Direct current capacitors are usually designed with structured coatings. Basically two different embodiments exist therefor, namely the what is referred to as square-segment and the what is referred to as T-segment. Efforts with respect to the development of an optimal design of corresponding structures have been made for these segments for decades (compare DE- LP 723 291, for example).

Structures other than a T-segmentation are a hexagon structure etc., for example.

An "optimal structure" should exhibit "self-dimensioning" properties. However, all currently known structures with "self-dimensioning" properties have not yet supplied fully satisfying results.

On the other hand, such satisfying results can be achieved for the size of the subcapacitances formed as a result of the segmentations and for the size of fuses in association with the maximally allowable energy turnover of the self-healing puncture and for a minimally allowable structure distance of the segmentations, which orientates itself at the a.c. voltage portion of a relevant application given otherwise equal boundary conditions with regard to the dimensioning. Instead of the circular form, a square can be considered as a first approximation or a rectangle with a specific aspect ratio L/B can be considered as a first approximation when the approximation is more coarse.

Power capacitors are constructed in comparatively large dimensions, so that large winding widths of the capacitor element usually represent a condition. However, this large winding width, in many cases, only allows a relatively disadvantageous aspect ratio L/B.

Given so fixed data, it has shown that a circular form is the ideal form of a sub-capacitance, which is created as a result of the segmentation, whereby an imaged puncture channel is being situated in the center of said circular form. Instead of a circular form, a square can be considered as first approximation, or a rectangle can be considered with a specific aspect ratio l/b when the approximation is more coarse.

Power capacitors are constructed in comparatively large dimensions, so that the capacitor element must normally have large winding widths. However, this large winding width, in many cases, only allows a relative disadvantageous aspect ratio L/B for the T-segmentation, which, per se, is advantageous.

Recently, self-healing film capacitors are often utilized together with IGBT semiconductor elements (IGBT=bipolar transistor with insulated gate). These IGBT semiconductor elements have high requirements with respect to a film capacitor concerning impulse and current load capability. This means that such a film capacitor, which is utilized together with an IGBT semiconductor element, must tolerate a particularly high energy turnover per film running length, which energy turnover lies clearly above the corresponding energy turnover for film capacitors, which are utilized together with GTO semiconductor elements (GTO=gate turn-off behavior).

Finally, tests have shown that, apart from the surge current load capability in association with operating field intensity and thermal resistance, the charging voltage must also be taken into consideration as further significant influencing variable for the utilization possibilities of power capacitors. However, a more strongly fashioned edge reinforcement that is undertaken in this regard does not lead to the desired success, whereby it must be taken into consideration that such a course of action with raised edge reinforcements is soon economically limited.

SUMMARY OF THE INVENTION

Therefore, the present invention is based on the object of creating a metallization for a film capacitor of the species cited above, which metallization has a coating profile that is characterized by a regeneration behavior, which is improved compared to existing metallizations; which also allows an increased current load capability and which has minimal coating losses, so that a higher utilization of the dielectric material is achieved given a reduced outlay.

This object is inventively achieved, with respect to a metallization, for a dielectric capacitor film, which is wound into a capacitor element in a running direction of the film and the metal coating is provided with segmentation with an improvement of the coating, in transverse direction relative to the running direction is composed of a profiled alloy metallization, whereby its principal constituents are variable depending on the traverse direction.

Given the inventive metallization, an alloy metallization, which is profiled transverse relative to the running direction of the capacitor film, is therefore utilized, which alloy metallization has a differently composed alloy depending on the transverse direction, which is perpendicular relative to the running direction, for example, whereby a structured metallization with segmentation of the coating is arranged in this area with maximal surface resistance, while there is no structuring provided in the adjacent area with minimal surface resistance. For example, a T-segmentation can be provided for the structuring of the metallization, whereby particularly advantageous aspect ratios L/B can be achieved. Fuses are provided in the area of a safety overlap between the two areas, namely the area for the structured metallization and the area with the profiled alloy metallization.

As a result of the inventive metallization, which uses a transversely profiled alloy metallization in addition to the usual T-segmentations, dissipated power that is reduced by 40% compared to existing metallization profiles can be achieved. In a preferable way, the main alloy components, namely aluminum and zinc, are altered along the transverse direction. For example, silver can also be added to these main alloy parts. (Silver can also serve as a blocking layer).

Given the inventive metallization, the optimal layer thickness ratio step/surface is primarily determined by the thermal load in the area of the safety overlap between the two above cited areas. However, when a minimal heat generation in the capacitor element is desired, it must be considered that the capacitor element is not self-healing in the area with the minimal surface resistance. Therefore, this is a "semi-self-healing" winding structure.

As it has already been explained above, a structured metallization for the segmentation of the coating is applied in the area of the maximal surface resistance given the inventive metallization. A preferred segmentation thereby is a T-segmentation. The T-segmentation has the particular advantage here that a situation is created, which is more beneficial by a factor 2 concerning the aspect ratios l/b, as this is possible in the prior art with the T-segmentation, since the transversely profiled alloy metallization is not provided there, and in which situation the self-healing can be fully utilized. Both films must be structured in this case.

Given a T-segmentation, fuses are provided preferably in the area of the safety overlay. However, it is also possible to arrange the fuses in the area of the contact zone and to forego the above cited advantage with the factor 2.

It has shown that the surge current load capability of a metallization with a transversely profiled alloy metallization is significantly higher compared to metallizations according to the prior art.

Besides, the fuses must only process a proportional surge current given a segmentation.

Potentially, the metallization can be completely transversely separated at a distance of, for example, 10 to 300 mm on the film, instead of or in addition to a structuring.

Given the capacitor element, a material coating can be potentially undertaken between the individual films with the respective coating, which is applied in an accurately proportioned quantity by means of applying, spraying or vapor-deposit in order to thus optimize the winding pressure in the capacitor element and to additionally positively influence the regeneration dependability.

The invention is subsequently explained in greater detail on the basis of the Figures.

DESCRIPTION OF THE PREFERRED EMBODIMENT

Figure 1:
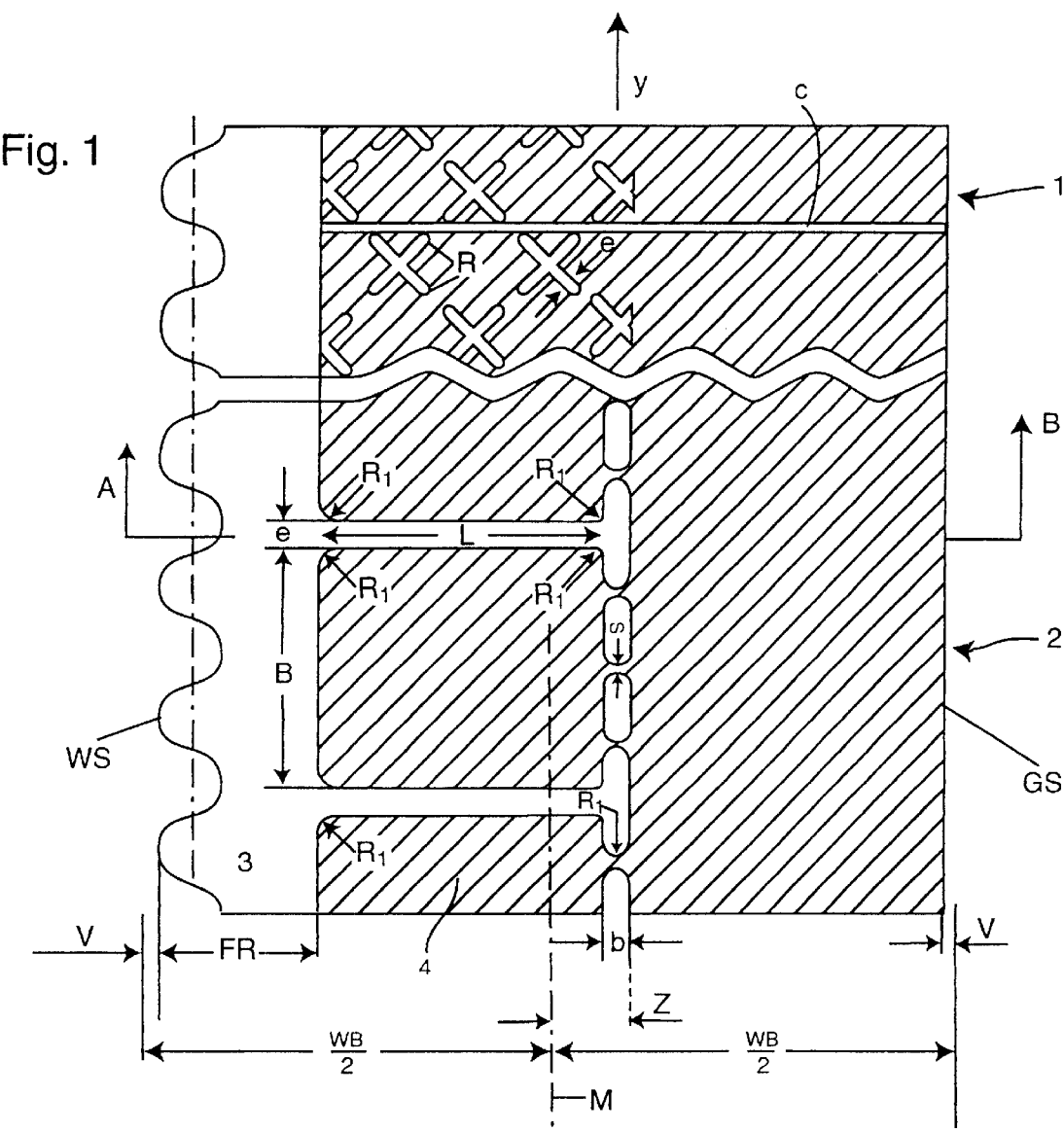
FIG. 1 is a plan view on the capacitor film in its running direction y.

In an upper part 1, FIG. 1 shows the what is referred to as square-segmentation, whereas a lower part 2 thereof shows the preferred T-segmentation. Further, part 1 shows a transverse separation c.

Figure 2:
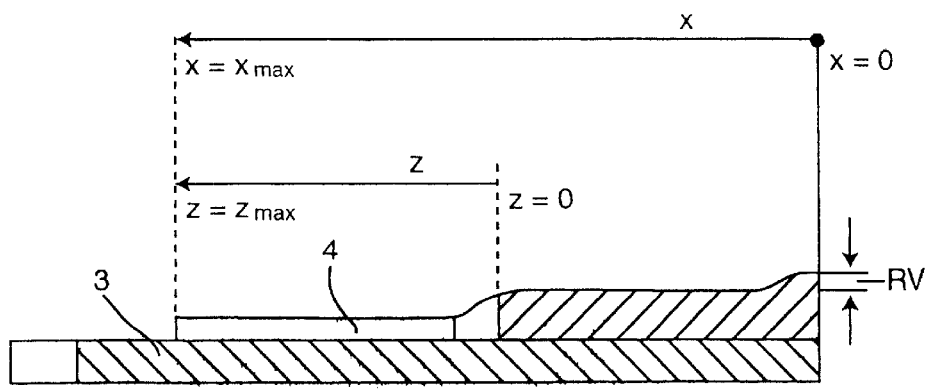
FIG. 2 is a section AB through the capacitor film of FIG. 1 in a transverse direction x perpendicular to the running direction y.

A segmented coating 4 composed of an aluminum and zinc alloy—whereby this alloy can also contain portions of silver or magnesium or similar metals—is applied on a dielectric film 3; which is composed of PET (polyester), PP (polypropylene) or other polymers, for example. The silver or magnesium can thereby also act as a blocking layer. The coating 4 thus forms a metallization profile and, in transverse direction x (up to $x-x_{max}$ (compare FIG. 2)), has a varying composition of its principal constituents, namely aluminum and zinc.

What is of importance is that the coating 4 is fashioned significantly thinner in a left part of the film 3 in the running direction (from z=0; compare FIG. 2) compared to a right part of this film 3. Therefore, the surface resistance in the left part of the coating 4, between z=0 and $z=z_{max}$, is considerably greater compared to the right part.

The film 3 itself has a weavy cut WS at its left edge and a smooth cut GS at its right edge, as this has already been proposed. Further, there is a free edge FR at the left edge, which free edge FR has no coating 4 applied on the film 3.

As it has already been explained, for example, the square-segmentation of the coating 4 is provided in the left part of the film in the part 1, whereby this segmentation having a width e has a radius R for a fuse formed by webs of the metallization. However, other structures, such as hexagons, are also possible.

Further, the left half of the coating 4 in part 2 shows a T-segmentation, which, at its end approximately in the center of the coating 4, has fuses attached with a connecting radius $R_1$ and a web width S.

The T-segmentation is essentially composed of slots with the length L and the width θ, in the coating 4. The length L and the width B of the sub-capacitances, which are separated by means of the slots, are essentially equal to one another.

The fuses are situated in the area z next to the center line M of the capacitor element with the winding width WB. The film 3 shows an offset V opposite this winding width WB.

The connecting radius of the individual sub-capacitances is also illustrated with $R_1$. An overlap Ue is given by the winding width, reduced by double of the sum from offset V and free edge FR.

A small A1-portion of approximately less than 5% is present in the alloy in the left part of the coating 4 (between z=0 and $z=z_{max}$) with a large surface resistance, while a large aluminum portion, which is approximately more than 5%, is desired in the alloy in the right part of the coating 4 with a small surface resistance. In the left part of the coating 4, the curve of the surface resistance R can thereby follow a function $R \sim 1/z^2$.

Potentially, the coating 4 can also be provided with an edge reinforcement RV, which, however, can also be foregone.

Therefore, the inventive metallization composed of the coating 4 comprises an alloy metallization that is transversely profiled relative to the running direction y of the capacitor film 3, which alloy metallization, which depends on to [sic] the transverse direction x, has a differently composed alloy and is preferably provided with a segmentation in the left part of FIG. 1, while fuses are arranged in a middle part in the area of the safety overlap 2Z. The metallization profiling can also be effected by means of changing the essential constituents of the alloy, namely aluminum and zinc, depending on the transverse direction x. The fuses can also be arranged in the right part of FIG. 1 when the segmentation is stretched out over the entire film.

I claim:

1. A capacitor film for self-healing foil capacitors comprising a dielectric film for winding in a running direction, said dielectric film being provided with a metallic coating composed of an alloy, said alloy having a composition changing in a transverse direction relative to the running direction, said metallic coating forming a profile with a first part and a second part, both parts extending along the running direction, the coating being significantly thinner in the first part than in the second part and the metallic coating being provided with segmentations only in the first part of the profile.

2. A capacitor film according to claim 1, wherein the first part is provided with fuses between the first part and the second part.

3. A capacitor film according to claim 1, wherein the segmentations are T-shaped segmentations.

4. A capacitor film according to claim 1, wherein the metallic coating is provided with a total transverse separation.

5. A capacitor film according to claim 1, wherein the second part of the metallic coating has fuses provided therein.

6. A capacitor film according to claim 1, wherein the principal constituents of the alloy are aluminum and zinc.

7. A capacitor film according to claim 6, wherein a metal selected from silver and magnesium is added to the alloy.

8. A capacitor film according to claim 1, wherein the metallic coating has a surface resistance $R_0$ according to a function $R_0 \sim 1/z^2$ in the first part, wherein z indicates a transverse direction x starting at the beginning of the first part.

9. A capacitor film according to claim 1, wherein the segmentation is a square segmentation.

10. A capacitor film according to claim 1, wherein the segmentation is a hexagonal segmentation.

* * * * *